(12) United States Patent
Ko et al.

(10) Patent No.: US 11,088,737 B2
(45) Date of Patent: *Aug. 10, 2021

(54) OPERATION FOR 3D BEAM FORMING IN A WIRELESS COMMUNICATION SYSTEM

(71) Applicant: LG ELECTRONICS INC., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,584

(22) Filed: Apr. 29, 2020

(65) Prior Publication Data

US 2020/0259537 A1   Aug. 13, 2020

Related U.S. Application Data

(63) Continuation of application No. 16/005,201, filed on Jun. 11, 2018, now Pat. No. 10,680,686, which is a
(Continued)

(51) Int. Cl.
| | |
|---|---|
| *H04B 7/04* | (2017.01) |
| *H04W 24/08* | (2009.01) |
| *H04B 7/06* | (2006.01) |
| *H04B 7/0456* | (2017.01) |
| *H04L 5/00* | (2006.01) |
| *H04B 7/0417* | (2017.01) |

(52) U.S. Cl.
CPC ......... *H04B 7/0456* (2013.01); *H04B 7/0417* (2013.01); *H04L 5/0032* (2013.01); *H04L 5/0048* (2013.01); *H04B 7/046* (2013.01); *H04B 7/0486* (2013.01)

(58) Field of Classification Search
CPC ................ H04B 7/0456; H04B 7/0417; H04B 7/0469; H04B 17/00; H04B 7/046; H04B 7/0486; H04B 7/0478; H04L 5/0032; H04L 5/0048; H04L 1/0675; H04L 1/0026; H04W 24/08; H04W 72/0413; H04W 72/0446; Y02D 30/70
USPC ......................................................... 370/329
See application file for complete search history.

(56) References Cited

U.S. PATENT DOCUMENTS

| | | |
|---|---|---|
| 2008/0188190 A1 | 8/2008 | Prasad et al. |
| 2008/0192849 A1 | 8/2008 | Kim .......................... H04L 1/06 375/260 |

(Continued)

OTHER PUBLICATIONS

U.S. Appl. No. 16/005,201, filed Jun. 11, 2018.
U.S. Appl. No. 14/552,918, filed Nov. 25, 2014.

*Primary Examiner* — Saumit Shah
*Assistant Examiner* — Vanneilian Lalchinthang
(74) *Attorney, Agent, or Firm* — Dentons US LLP

(57) ABSTRACT

Here, operation for 3D beam forming is disclosed. UE, receiving reference signals from one or more base stations (eNBs), may report feedback information comprising precoding matrix information to the one or more eNBs. The precoding matrix information indicates a first type precoding matrix for a horizontal direction and a second type precoding matrix for a vertical direction. eNBs may transmit signals, which are precoded based on a third type precoding matrix for beam forming both on the horizontal direction and the vertical direction.

20 Claims, 11 Drawing Sheets

Related U.S. Application Data continuation of application No. 14/552,918, filed on Nov. 25, 2014, now Pat. No. 10,009,075.

(60) Provisional application No. 61/909,375, filed on Nov. 27, 2013.

(56) References Cited

U.S. PATENT DOCUMENTS

| | | | |
|---|---|---|---|
| 2011/0216846 A1 | 9/2011 | Lee | H04B 7/0473 375/295 |
| 2013/0308715 A1 | 11/2013 | Nam | H04B 7/0469 375/267 |
| 2014/0016549 A1 | 1/2014 | Novlan | H04B 7/0417 370/328 |
| 2014/0098689 A1 | 4/2014 | Lee | H04B 7/0469 370/252 |
| 2014/0177683 A1 | 6/2014 | Krishnamurthy | H04B 7/0469 375/219 |
| 2014/0301492 A1 | 10/2014 | Xin et al. | |
| 2016/0269089 A1 | 9/2016 | Liu | H04B 7/0626 |

(a) Existing antenna system  (b) Active antenna system

Elevation angle   Horizontal angle

Location of Antenna element: (n,m)

OPERATION FOR 3D BEAM FORMING IN A WIRELESS COMMUNICATION SYSTEM

CROSS REFERENCE

This application is a continuation of U.S. patent application Ser. No. 16/005,201, filed on Jun. 11, 2018, which is a continuation of U.S. patent application Ser. No. 14/552,918, filed on Nov. 25, 2014, now issued as U.S. Pat. No. 10,009,075, which claims the benefit of the U.S. Provisional Application No. 61/909,375, filed on Nov. 27, 2013, all of which are incorporated by reference in their entirety herein.

BACKGROUND OF THE INVENTION

Field of the Invention

The present invention relates to a wireless communication system, and more particularly, to methods for an operation for 3D beam forming and apparatuses therefor.

Discussion of the Related Art

As an example of a wireless communication system to which the present invention is applicable, a 3rd generation partnership project (3GPP) long term evolution (LTE) communication system will be schematically described.

FIG. 1 is a schematic diagram of E-UMTS network structure as an example of a wireless communication system.

E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, enhancement in MIMO technology is demanded for better communication.

SUMMARY OF THE INVENTION

Accordingly, the present invention is directed to methods for operating for 3D beam forming and apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a user equipment (UE) to operate in a wireless communication system is provided. The method comprises: receiving reference signals from one or more base stations (eNBs); reporting feedback information comprising precoding matrix information to the one or more eNBs, wherein the precoding matrix information indicates a first type precoding matrix for a horizontal direction and a second type precoding matrix for a vertical direction; and receiving signals from the eNBs, wherein the signals are precoded based on a third type precoding matrix for beam forming both on the horizontal direction and the vertical direction.

In another aspect of the present invention, a user equipment for operating in a wireless communication system is provided. The UE comprises: a transceiver adapted to transmit or receive signals over the air; a microprocessor electrically connected to the transceiver and adapted to control the transceiver to: receive reference signals from one or more base stations (eNBs); report feedback information comprising precoding matrix information to the one or more eNBs, wherein the precoding matrix information indicates a first type precoding matrix for a horizontal direction and a second type precoding matrix for a vertical direction; and receive signals from the eNBs, wherein the signals are precoded based on a third type precoding matrix for beam forming both on the horizontal direction and the vertical direction.

The third type precoding matrix may be selected by considering a combination of the first type precoding matrix and the second type precoding matrix corresponding to the precoding matrix information.

The third type precoding matrix may correspond to a Kronecker product of the first type precoding matrix and the second type precoding matrix corresponding to the precoding matrix information.

The first type precoding matrix may be selected from a first type codebook comprising Rank 1 to Rank M precoding matrixes, the M corresponding to a number of transmission antennas, and the second type precoding matrix may be selected from a second type codebook comprising Rank 1 precoding matrixes.

The precoding matrix information may comprise a first index for indicating the first type precoding matrix and a second index for indicating the second type precoding matrix. In this case, the reporting feedback information may comprise: reporting the first index with a first period; and reporting the second index with a second period, wherein the second period is longer than the first period.

The second type precoding matrix selected based on the second index is differently selected based on the first index.

The first type codebook may comprise precoding matrixes for beam forming in the horizontal direction with equal horizontal angle distribution, and the second type codebook may comprise precoding matrixes for beam forming in the vertical direction with different vertical angle distribution.

The second codebook may comprise more precoding matrixes for beam forming with vertical angle for 0°~45° than precoding matrixes for beam forming with vertical angle for 45°~90° and 0°~−90°.

The second codebook may comprise more precoding matrixes for beam forming with vertical angle for 0°~45° than precoding matrixes for beam forming with vertical angle for −45°~−90° and 0°~90°.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 1:
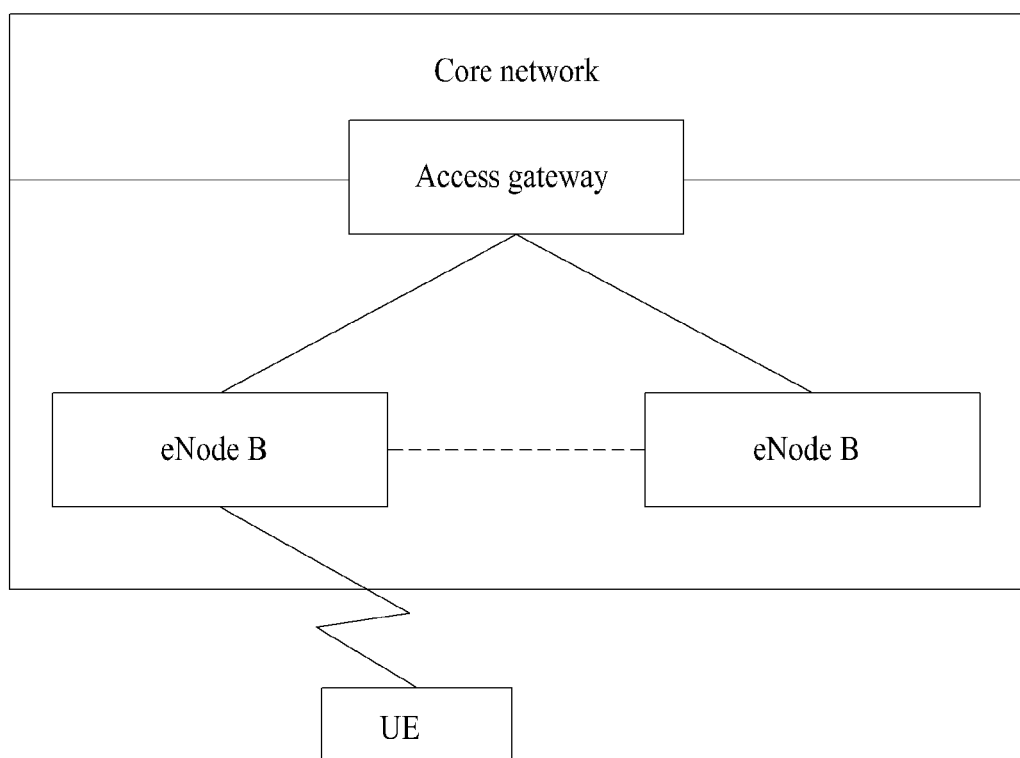
FIG. 1 is a schematic diagram of E-UMTS network structure as an example of a wireless communication system.
Figure 2:
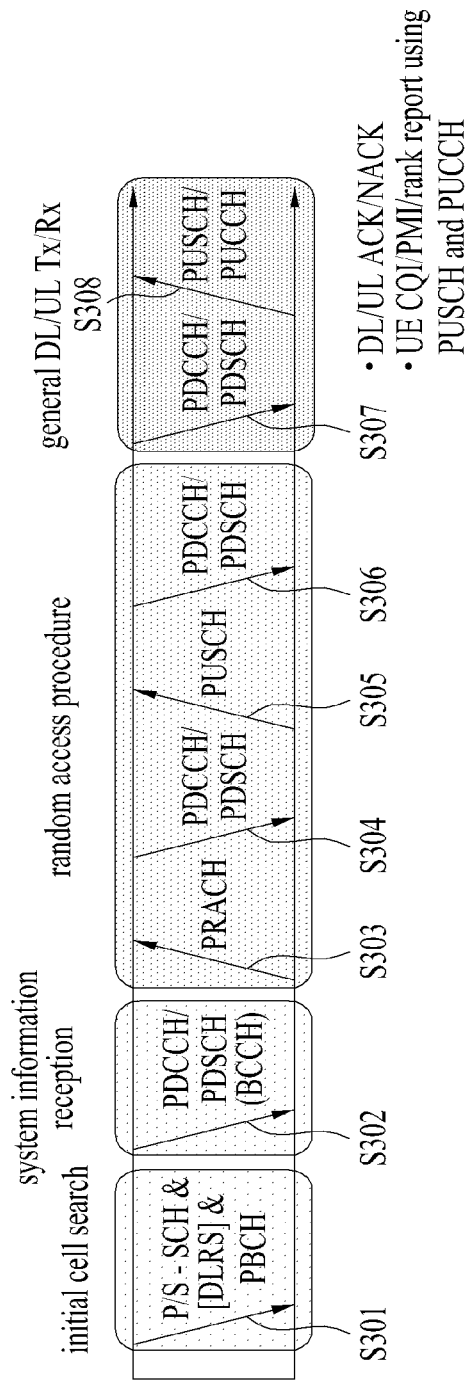
FIG. 2 is a diagram for explaining physical channels used by 3GPP system and a general signal transmitting method using the same.

FIG. 2 is a diagram for explaining physical channels used by 3GPP system and a general signal transmitting method using the same.

Referring to FIG. 2, if a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 3:
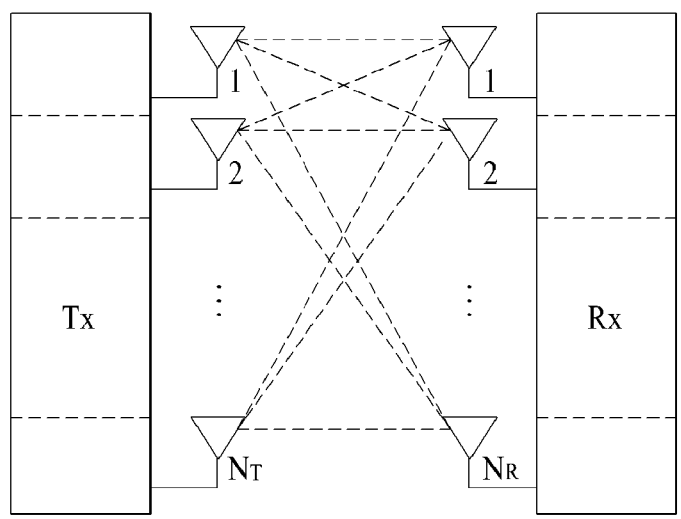
FIG. 3 is a diagram for a configuration of a general multi-antenna (MIMO) communication system.

FIG. 3 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Equation 1. In this case, $R_i$ is a smaller one of $N_T$ and $N_R$.

$$R_i = \min(N_T, N_R) \quad \text{[Equation 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 3, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Equation 2.

$$s = [s_1, s_2, \ldots, s_{N_T}]^T \quad \text{[Equation 2]}$$

Meanwhile, transmission powers can be set different from each other for transmission informations $s_1, s_2, \ldots, s_{N_T}$ respectively. If the transmission powers are set to $P_1, P_2, \ldots, P_{N_T}$ respectively, the transmission power adjusted transmission information can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

And, $\hat{S}$ may be represented as Equation 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Equation 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by equation, a rank of a channel H (i.e., rank (H)) is limited by Equation 6.

$$\text{rank}(H) \leq \min(N_T, N_R) \quad \text{[Equation 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Equation 7.

$$\text{\# of streams} \leq \text{rank}(H) \leq \min(N_T, N_R) \quad \text{[Equation 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

In the following description, an active antenna system (AAS) and a 3-dimensional (3D) beamforming of one embodiment of the present invention are explained.

First of all, in an existing cellular system, a base station reduces inter-cell interference and enhances throughput (e.g., SINR (signal to interference plus noise ratio)) of user equipments in a cell, using a mechanical tilting or an electrical tilting. This is described in detail with reference to the accompanying drawings as follows.

Figure 4:
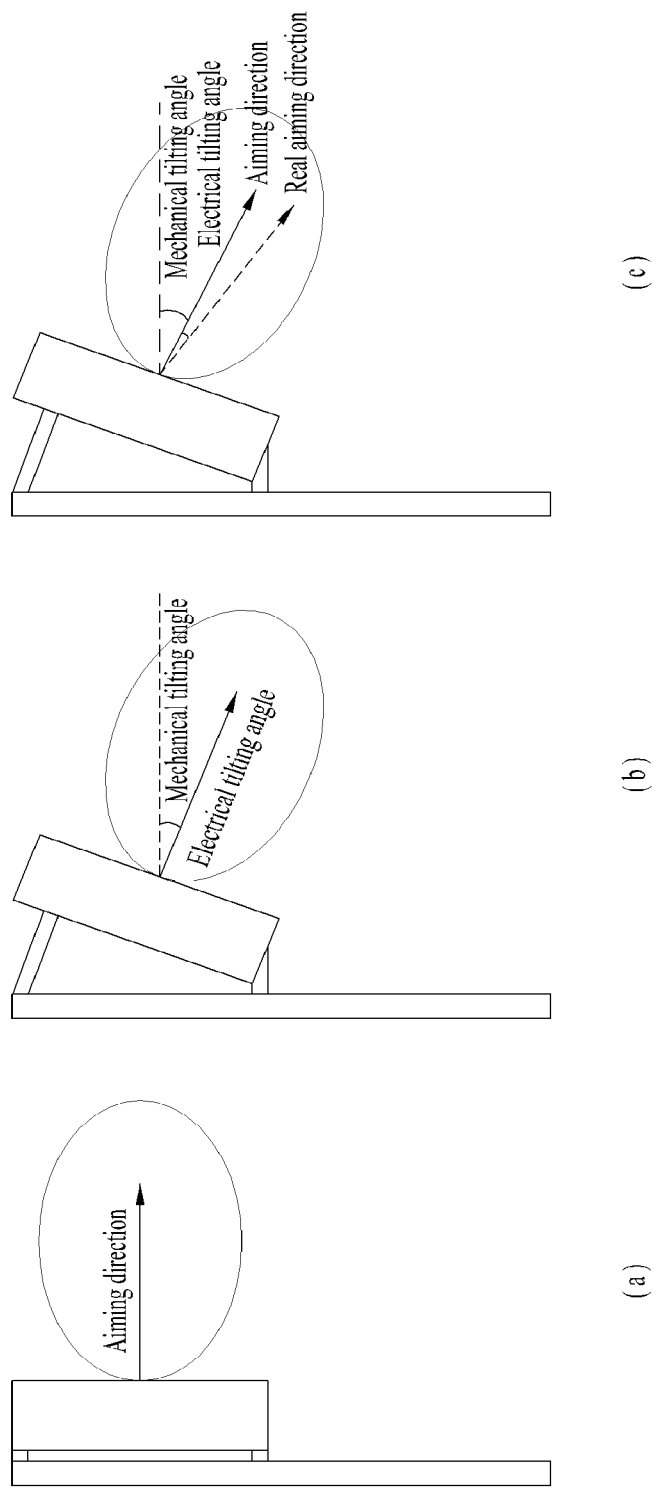
FIGS. 4 a, b and c are diagrams describing an antenna tilting system.

FIG. 4 is a diagram to describe an antenna tilting system.

Particularly, FIG. 4 (a) shows an antenna structure to which an antenna tilting is not applied. FIG. 4 (b) shows an antenna structure to which a mechanical tilting is applied. And, FIG. 4 (c) shows an antenna structure to which both a mechanical tilting and an electrical tilting are applied.

Comparing FIG. 4 (a) and FIG. 4 (b) to each other, regarding a mechanical tilting, as shown in FIG. 4 (b), it is disadvantageous in that a beam direction is fixed in case of an initial installation. Moreover, regarding an electrical tilting, as shown in FIG. 4 (c), despite that a tilting angle is changeable using an internal phase shift module, it is disadvantageous in that a very restrictive vertical beamforming is available only due to a substantially cell-fixed tilting.

Figure 5:
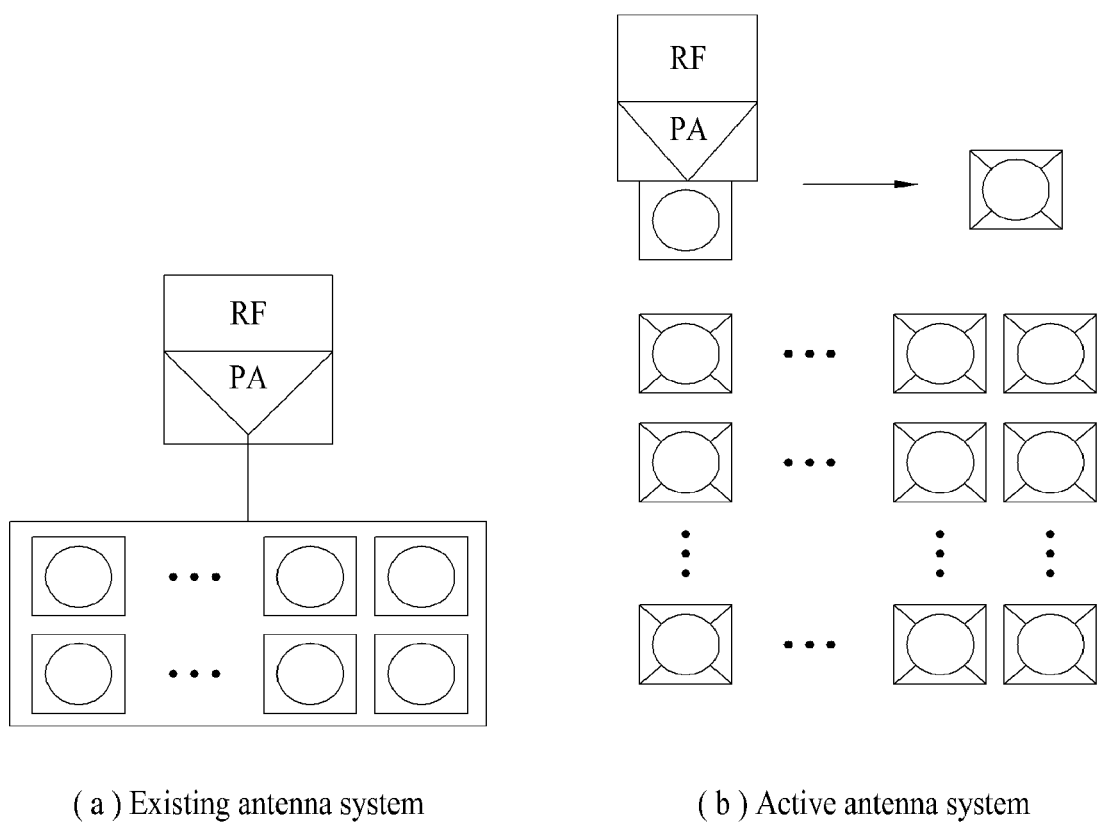
FIGS. 5 a and b are diagrams illustrating one example of comparing an existing antenna system and an active antenna system to each other.

FIG. 5 is a diagram for one example of comparing an existing antenna system and an active antenna system to each other.

Particularly, FIG. 5 (a) shows an existing antenna system, while FIG. 5 (b) shows an active antenna system.

Referring to FIG. 5, in an active antenna system, unlike an existing antenna system, each of a plurality of antenna modules includes active devices such as a power amplifier, an RF module and the like. Hence, the active antenna system is capable of controlling/adjusting a power and phase for each of the antenna modules.

In a generally considered MIMO antenna structure, a linear antenna (i.e., 1-dimensional array antenna) like a ULA (uniform linear array) antenna is taken into consideration. In this 1-dimensional array structure, a beam generable by beamforming exists in a 2-dimensional plane. This applies to a PAS (passive antenna system) based MIMO structure of an existing base station. Although vertical antennas and horizontal antennas exist in the PAS based base station, since the vertical antennas are combined into one RF module, beamforming in vertical direction is impossible but the above-mentioned mechanical tilting is applicable only.

Yet, as an antenna structure of a base station evolves into AAS, an independent RF module is implemented for each antenna in a vertical direction, whereby a beamforming in a vertical direction is possible as well as in a horizontal direction. Such a beamforming is called an elevation beamforming.

According to the elevation beamforming, generable beams can be represented in a 3-dimensional space in vertical and horizontal directions. Hence, such a beamforming can be named a 3-dimensional (3D) beamforming. In particular, the 3D beamforming is possible because the 1D array antenna structure is evolved into a 2D array antenna structure in a plane shape. In this case, the 3D beamforming is possible in a 3D array structure of a ring shape as well as in a planar-shaped antenna array structure. The 3D beamforming is characterized in that an MIMO process is performed in a 3D space owing to antenna deployments of various types instead of an existing 1D array antenna structure.

Figure 6:
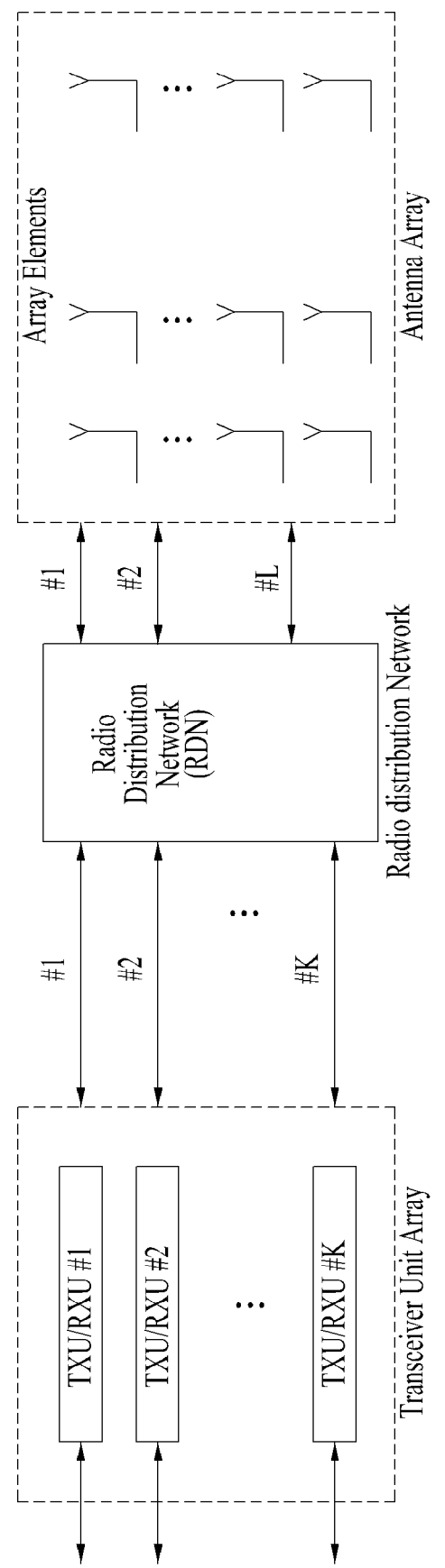
FIG. 6 shows a general AAS Radio Architecture for implementing the present invention.

FIG. 6 shows a general AAS Radio Architecture for implementing the present invention.

As shown in FIG. 6, AAS Radio Architecture may comprise a transceiver unit array, Radio Distribution Network (RDN) and antenna array. Transceiver unit array may comprise K TXU/RXU. So, K transmission or reception data units may be delivered to RDN, and the RDN may distribute these data unit to L antenna elements.

By using this architecture, the embodiments of the present invention can be implemented.

Conventionally, eNB used antenna structure (e.g. Uniform Linear Array, Cross-polarized Array) for beamforming only on Azimuth direction. (e.g. 3GPP LTE Release-8/9/10/11). However, the present invention is directed to 2D array structure for MIMO transmission scheme to improve the system performance.

Figure 7:
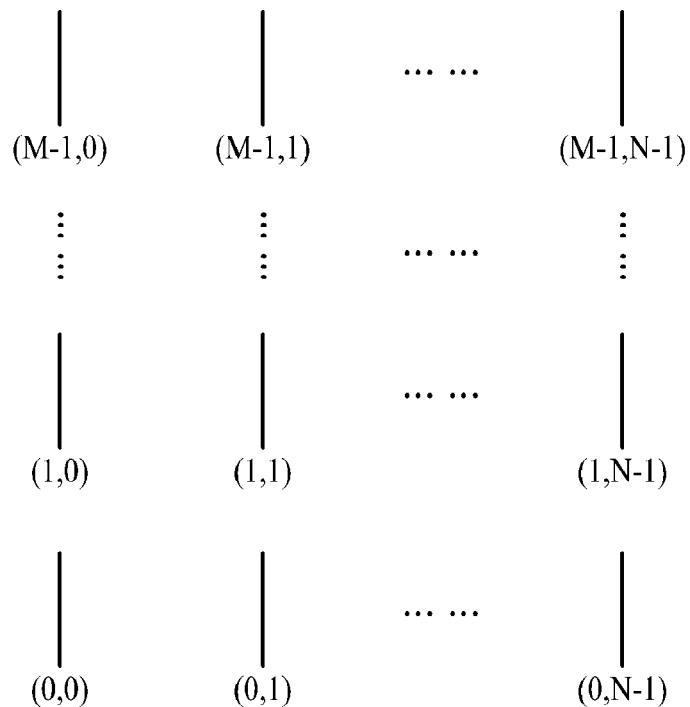
FIGS. 7 and 8 show examples of 2D Array structure.
Figure 8:
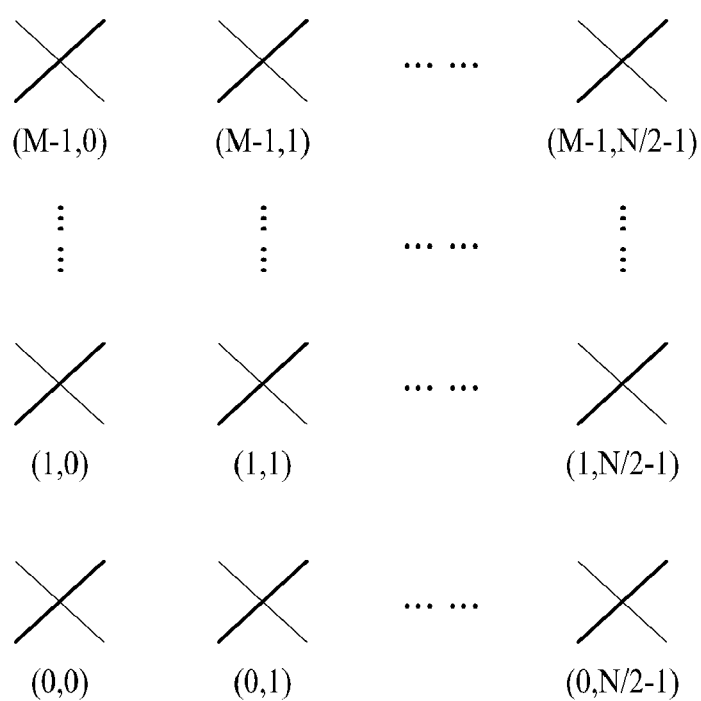

FIGS. 7 and 8 show examples of 2D Array structure.

Specifically, FIG. 7 shows an M*N antenna array with each column of a uniform linear array. And, FIG. 8 shows an M*N/2 antenna array with each column of a pair of cross-polarized arrays.

Figure 11:
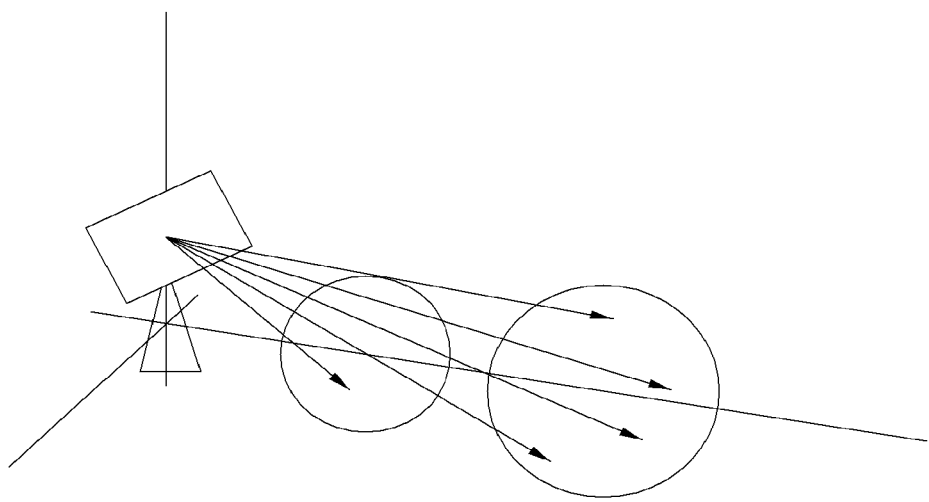
FIGS. 11-14 show application of 3D beam forming according to the present invention.
Figure 12:
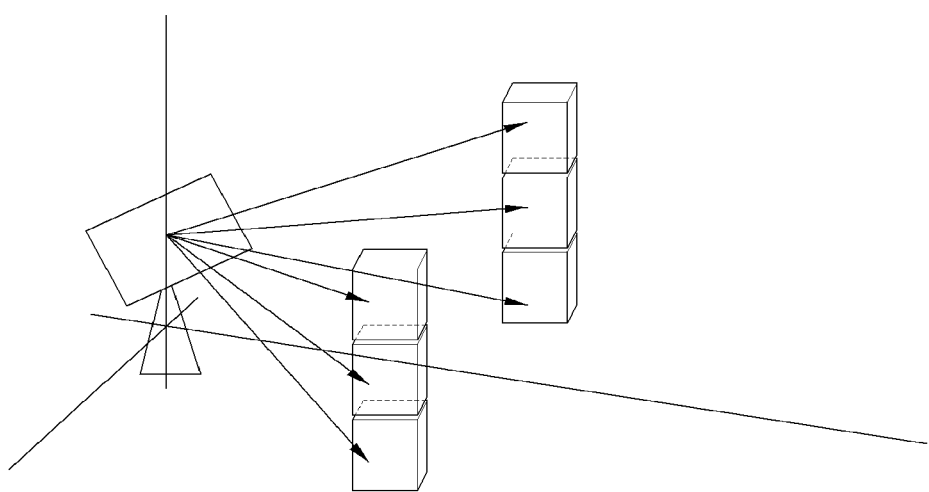

By using 2D Array Structure, as shown in FIGS. 11 and 12, beamforming on both Azimuth angle (horizontal direction angle) and Elevation angle (vertical direction angle) can be possible. By using this, the following features can be implemented.

Sector specific elevation beamforming (e.g. Adaptive control over the vertical pattern beam-width and/or downtilt)

Advanced sectorization in the vertical domain

User-specific elevation beamforming

Vertical Sectorization can improve system performance based on Vertical Sector pattern gain. Also, Vertical Sectorization generally does not require additional standardization.

UE specific Elevation beamforming can improve SINR of UEs by determining Vertical antenna pattern to UE direction. But, contrary to Vertical Sectorization or Sector-specific Vertical Beamforming, UE-specific elevation beamforming may require additional standardization. For example, 2 dimensional port structure requires UE's CSI estimation and feedback mechanism for UE specific elevation beamforming.

DL MIMO enhancement elements for supporting UE specific elevation beamforming may include:

UE CSI feedback enhancement (A. New codebook design; B. Schemes for Codebook selection, update, change; C. CSI payload size)

CSI-RS change for UE specific elevation beamforming

Definition of antenna port for UE specific elevation beamforming

Downlink control enhancement for UE specific elevation beamforming (Additional schemes to acquire common channel coverage and/or RRM measurement reliability when the number of antenna ports increases)

On the other hand, the followings are things to be considered when designing.

eNB antenna calibration errors (phase and time)

Estimation Errors

Downlink overhead

Complexity

Feedback overhead

Backward compatibility

Practical UE implementation

Reuse of existing feedback framework

Subband versus wideband feedback

Planar (or Rectangular) Array (Planar antenna architecture)

Following is the explanation for implementing the above scheme.

Figure 9:
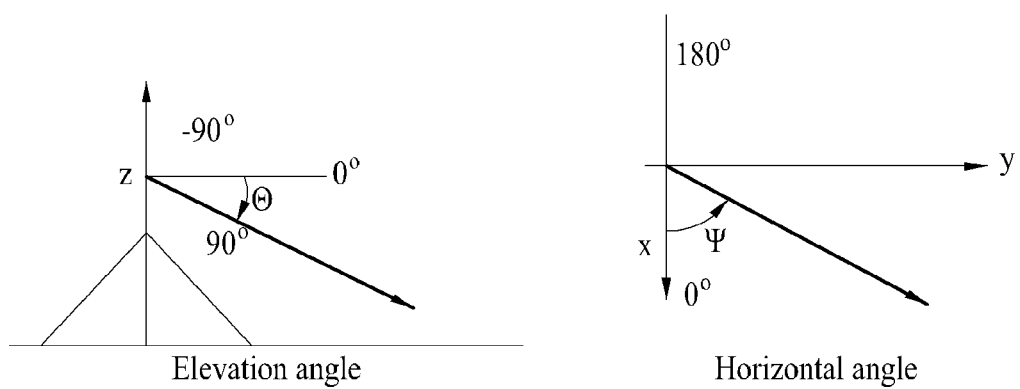
FIG. 9 is a diagram for defining elevation angle and horizontal angle.

FIG. 9 is a diagram for defining elevation angle and horizontal angle.

As shown in the left side of FIG. 9, the Elevation angle can be defined from −90°~90° with a reference to 0° on the horizontal plane. Also, horizontal angle can be defined from 0°~180° as shown in the right side of FIG. 9.

Figure 10:
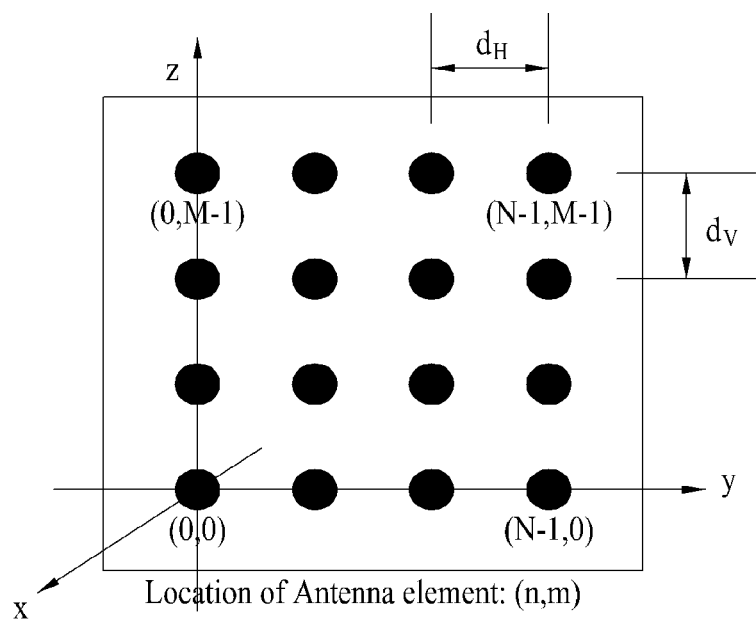
FIG. 10 shows an example of deployment of 2D array in 3D space.

FIG. 10 shows an example of deployment of 2D array in 3D space.

As indicated in FIG. 10, the location of antenna element (n, m) has difference from each other. The space between neighboring antennas in horizontal direction can be represented as $d_H$ and the space between neighboring antenna in vertical direction can be represented as $d_V$.

Besides the above mapping, the RDN can perform a complex weighting on the signal from each port and distributes it among the sub-array, to control of side lobe levels and tilting angle. The complex weighting includes amplitude weighting and phase shift.

Let $S_p$ be the set of the antenna elements in sub-array associated with antenna port p, then complex weights on antenna element (m, n) can be given by:

$$w_{m,n}=|w_{m,n}|\exp(-j2\pi\lambda_0^{-1}(\bar{\phi}_{etilt}\cdot\bar{r}_{m,n})), (m,n)\in S_p \quad \text{[Equation 8]}$$

where $|W_{m,n}|$ is the amplitude weight on antenna element (m,n).

The element location vector $\bar{r}_{m,n}$ and unit directional vector $\bar{\phi}_{etilt}$ can be respectively given by:

$$\bar{r}_{m,n}=[0 \; n\cdot d_H \; m\cdot d_V]^T$$

$$\phi_{etilt}==[\cos\theta_{etilt}\cos\varphi_{escan}\cos\theta_{etilt}\sin\varphi_{escan}\sin\theta_{etilt}]^T \quad \text{[Equation 9]}$$

$\theta_{etilt}$—the vertical steering angle, and $\varphi_{scan}$—the horizontal steering angle.

On the other hand, the radiation pattern for an antenna port p can be given by:

$$A_p(\theta,\varphi)=A_E(\theta,\varphi)+10\log_{10}\left(\left|\sum_{(m,n)\in S_p} w_{m,n}\cdot v_{m,n}\right|^2\right) \quad \text{[Equation 10]}$$

where $S_p$ is the set of antenna elements within the sub-array associated with antenna port p, $A_E(\varphi,\theta)$ is the 3D element pattern given in Table 1 of Appendix A, agreed in RAN4, $\varphi$ the azimuth angle is defined between −180° and 180°, and $\theta$ the elevation angle is defined between −90° and 90° (0° represents perpendicular to array).

$v_{m,n}$ the phase shift factor due to array placement is given by:

$$v_{m,n}=\exp(j2\pi\lambda_0^{-1}(\bar{\phi}\cdot\bar{r}_{m,n})), (m,n)\in S_p$$

$$\bar{\phi}=[\cos\theta\cos\varphi\cos\theta\sin\varphi\sin\theta]^T \quad \text{[Equation 11]}$$

It should be noted that the losses of the cable network should be added to the max gain to calculate the gain of an active antenna, as given, for example, in Table 1 below.

FIGS. 11-14 show application of 3D beam forming according to the present invention.

Specifically, as shown in FIG. 11, by using the present invention for beamforming with Elevation angle, Sectorization on Vertical domain can be available. At the same time, Horizontal Beamforming with Azimuth angle within the Vertical sector can be available.

And, as shown in FIG. 12, by using elevation beamforming, the base station can support high quality service to users located in positions higher than the antennas of the base station.

In urban area, there are buildings having various heights. Generally, the antenna of the base station is installed on the top of a specific building, and the height of the buildings surrounding the specific building can be higher or lower than the specific building.

Figure 13:
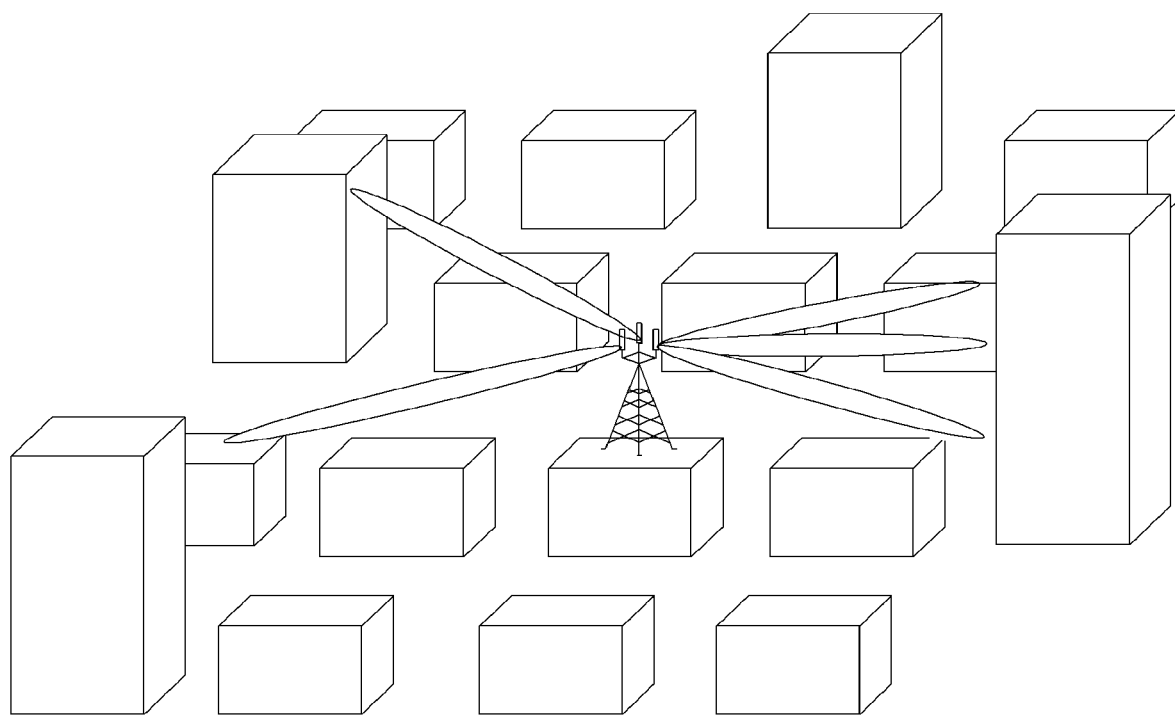

FIG. 13 shows an example of a situation where antenna of the base station is surrounded with high level buildings.

In this case, since there is no obstruction between the antenna of the base station and the target, channel with strong LOS element can be established. Also, vertical beamforming to the high building may be more important than the horizontal domain beamforming.

Figure 14:
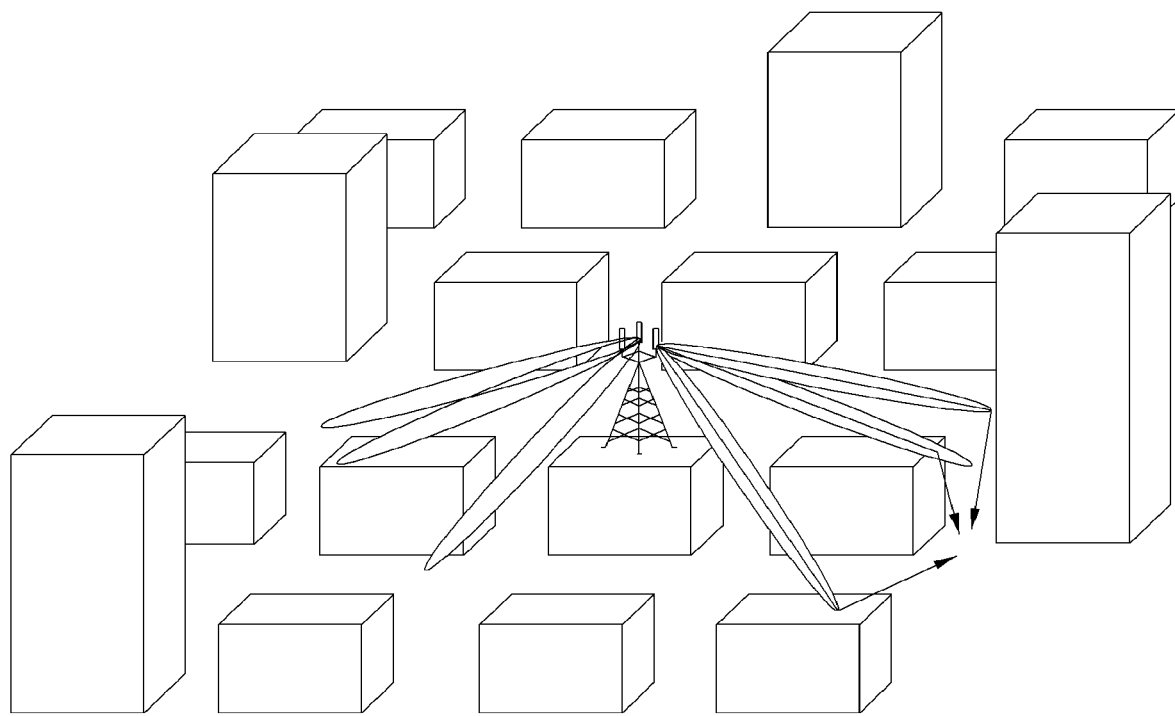

FIG. 14 shows an example of a situation where antenna of the base station is located on the top of high level building and surrounded with low level buildings.

In this case, a channel with lots of NLOS elements can be established, since the signals from the antenna of the base station can be refracted by the roof of the building and/or reflected by the floor of the building. By using downward vertical beamforming, the various spacial channels represented both by elevation angle and Azimuth angle can be established, espetially for the Users in the backside of a building.

Conventionally, codebook or feedback codebook for horizontal beamforming divide Azimuth angle with equal interval (e.g., when designing DFT based codebook, 2*pi/N of exp(j*2*pi*n*k/N)$^0$||λ$^-$|2*pi/N represents equal interval division), or is designed to form a beam to arbitrary direction (e.g., precoding matrix with Random phase).

If the codebook for 3D beamforming divides Elevation angle domain and Azimuth angle domain with equal interval, the efficiency may be lowered since there would be precoding matrixes not frequently used comparing to other precoding matrixes.

So, the following is for explaining the codebook design for implementing the above 3D beam forming schemes.

To efficiently design the codebook for both horizontal direction beamforming and vertical direction beamforming, one embodiment of the present invention proposed to design the codebook with a combination of 2 types of precoding

TABLE 1

| Horizontal radiation pattern | $A_{E,H}(\varphi) = -\min\left[12\left(\frac{\varphi}{\varphi_{3dB}}\right)^2, A_m\right]$ dB |
|---|---|
| Front to back ratio | $A_m$ = 30 dB |
| Vertical radiation pattern | $A_{E,V}(\theta) = -\min\left[12\left(\frac{\theta}{\theta_{3dB}}\right)^2, SLA_v\right]$ |
| Side lobe lower level | $SLA_v$ = 30 dB |
| 3D element pattern | $A_E(\varphi,\theta) = G_{E,max} - \min\{-[A_{E,H}(\varphi)+A_{E,V}(\theta)], A_m\}$ |
| Additional parameters are provided in A10 of Table 5.4.4.2.1-1 in TR37.840. | | matrixes, one for horizontal direction and the other for the vertical direction. And, each of precoding matrix can be indicated with respective indicator or index ($I_1$, $I_2$).

Figure 15:
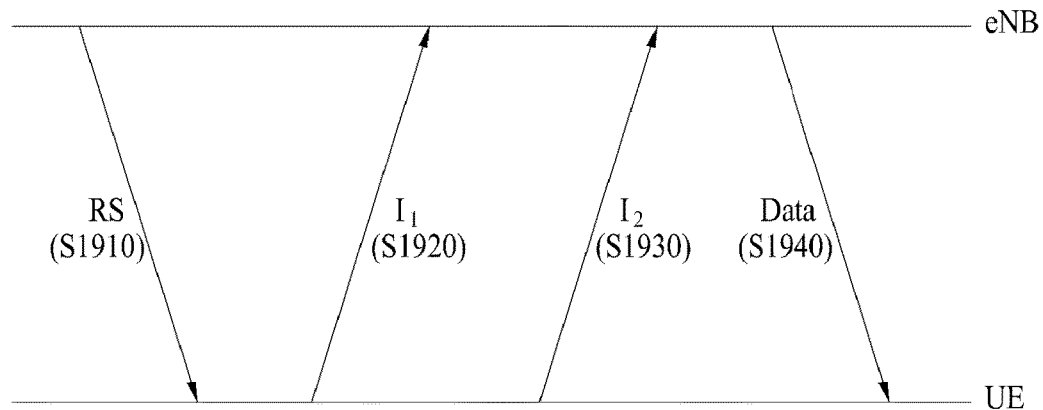
FIG. 15 shows a concept of feedback the precoding matrix information in accordance with the present embodiment of the invention.

FIG. 15 shows a concept of feedback the precoding matrix information in accordance with the present embodiment of the invention.

UE may receive reference signals (RSs) from one or more eNBs (S1910). This RS can be CRS according to rel. 8 of LTE standard, or CSI-RS according to rel. 10 or later of LTE-A standard. When the UE receives RSs, the UE may estimate the channel status and determine the preferred precoding matrix both on horizontal direction and vertical direction. So, UE may select $I_1$ from the first type codebook for vertical beam forming and h from the second type codebook for horizontal beam forming. The indication of $I_1$ and $I_2$ can be changed.

Then, UE may report this precoding matrix information to the eNB (S1920, S1930). The $I_1$ and $I_2$ can be reported together, but they can be reported at separate timing to reduce the reporting overhead. In one example, UE may report $I_1$ with period P1 (S1920) and $I_2$ with period P2 (S1930). P1 may be longer than P2.

When the eNB receives $I_1$ and $I_2$, eNB may construct the third type precoding matrix with the first type precoding matrix (Wv: precoding matrix for vertical direction beam forming) and the second type precoding matrix (Wh: precoding matrix for horizontal direction beam forming). It should be noted that eNB may select Wv and Wh according to $I_1$ and $I_2$, and override these preferred precoding matrixes considering the situation of system. But, in the following explanation, we will assume that the Wv is selected based on $I_1$ and Wh is selected based on $I_2$. In any case, eNB selects Wv and Wh 'considering' $I_1$ and $I_2$.

In one example, eNB may select Wv and Wh with 1 to 1 correspondence as shown below.

TABLE 2

| $I_1^2$ | I | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |
| 1 | Wv(1), Wh(0) | Wv(1), Wh(1) | Wv(1), Wh(2) | Wv(1), Wh(3) |
| 2 | Wv(2), Wh(0) | Wv(2), Wh(1) | Wv(2), Wh(2) | Wv(2), Wh(3) |
| 3 | Wv(3), Wh(0) | Wv(3), Wh(1) | Wv(3), Wh(2) | Wv(3), Wh(3) |

In another example, eNB may select two or more Wv based on $I_1$ and one of them is selected based on $I_2$. The same rational can be applied to the selection of Wh based on the combination of $I_1$ and $I_2$. This example can be represented as Table 3 or 4 below.

TABLE 3

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(1), Wh(0) | Wv(1), Wh(1) | Wv(1), Wh(2) | Wv(1), Wh(3) | Wv(2), Wh(0) | Wv(2), Wh(1) | Wv(2), Wh(2) | Wv(2), Wh(3) |
| 2 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 3 | Wv(3), Wh(0) | Wv(3), Wh(1) | Wv(3), Wh(2) | Wv(3), Wh(3) | Wv(0), Wh(0) | Wv(0), Wh(1) | Wv(0), Wh(2) | Wv(0), Wh(3) |

TABLE 4

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 2 | Wv(4), Wh(0) | Wv(4), Wh(1) | Wv(4), Wh(2) | Wv(4), Wh(3) | Wv(5), Wh(0) | Wv(5), Wh(1) | Wv(5), Wh(2) | Wv(5), Wh(3) |
| 3 | Wv(6), Wh(0) | Wv(6), Wh(1) | Wv(6), Wh(2) | Wv(6), Wh(3) | Wv(7), Wh(0) | Wv(7), Wh(1) | Wv(7), Wh(2) | Wv(7), Wh(3) |

In another example, eNB may use fixed Wv and Wh can be selected based on the combination of $I_1$ and $I_2$. This example can be represented as Table 5A below.

TABLE 5

| $I_1^2$ | I | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |
| 1 | Wv(0), Wh(4) | Wv(0), Wh(5) | Wv(0), Wh(6) | Wv(0), Wh(7) |
| 2 | Wv(1), Wh(0) | Wv(1), Wh(1) | Wv(1), Wh(2) | Wv(1), Wh(3) |

TABLE 5-continued

| $I_1^2$ | I | | | |
|---|---|---|---|---|
| | 0 | 1 | 2 | 3 |
| 3 | Wv(1), Wh(4) | Wv(1), Wh(5) | Wv(1), Wh(6) | Wv(1), Wh(7) |

In another example, the number of precoding matrix in the codebook for vertical direction varies depending on the index of the precoding matrix for horizontal direction. The codebook for vertical direction may comprise more precoding matrixes for 0°~45° than the precoding matrixes for 45°~90° and 0°~−90°. In another example, the codebook for vertical direction may comprise more precoding matrixes for 0°~45° than the precoding matrixes for 0°~90° and for −45°~−90°.

Based on these selections, eNB may construct the precoding matrix for 3D beamforming. In one example, eNB may use Kronecker product of the two precoding matrixes (Wv and Wh).

$$W_{l,m} = Wv_l \otimes Wh_m \quad \text{[Equation 12]}$$

By using this precoding matrix, eNB may transmit signals with 3D beamforming (S1940).

In another example, the UE may use two indicators for vertical direction precoding matrix (V-$I_1$ and V-$I_2$). V-$I_1$ and V-$I_2$ can be reported together, or separately. By using these two indicators, the precoding matrix for vertical direction can be selected as Table 5B.

TABLE 5

| | V - | |
|---|---|---|
| $I_2$ V-$I_1$ | 0 | 1 |
| 0 | Wv (0) | Wv (1) |
| 1 | Wv (1) | Wv (2) |
| 2 | Wv (2) | Wv (3) |
| 3 | Wv (3) | Wv (0) |

In the following explanation, precoding matrix for vertical beamforming is assumed as Rank 1 precoding matrix, and precoding matrix for horizontal beamforming is assumed as Rank M precoding matrix, where M represents the number of transmission antennas. And, the precoding matrix for horizontal beamforming can be used from among the following precoding matrix for 2D beamforming.

Codebook for transmission on antenna ports {0,1} and for CSI reporting based on antenna ports {0,1} or {15,16} can be represented as:

TABLE 6

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |

TABLE 6-continued

| Codebook index | Number of layers $\upsilon$ | |
|---|---|---|
| | 1 | 2 |
| 3 | $\frac{1}{\sqrt{2}}\begin{bmatrix}1\\-j\end{bmatrix}$ | — |

On the other hand, the codebook for horizontal beamforming for Ranks 1 and 2 may be selected from the following:

TABLE 7

| | $i_2$ | | | |
|---|---|---|---|---|
| $i_1$ | 0 | 1 | 2 | 3 |
| 0-15 | $W_{i_1,0}^{(1)}$ | $W_{i_1,4}^{(1)}$ | $W_{i_1,8}^{(1)}$ | $W_{i_1,12}^{(1)}$ |
| | $i_2$ | | | |
| $i_1$ | 4 | 5 | 6 | 7 |
| 0-15 | $W_{i_1+8,1}^{(1)}$ | $W_{i_1+8,5}^{(1)}$ | $W_{i_1+8,9}^{(1)}$ | $W_{i_1+8,13}^{(1)}$ |
| | $i_2$ | | | |
| $i_1$ | 8 | 9 | 10 | 11 |
| 0-15 | $W_{i_1+16,2}^{(1)}$ | $W_{i_1+16,6}^{(1)}$ | $W_{i_1+16,10}^{(1)}$ | $W_{i_1+16,14}^{(1)}$ |
| | $i_2$ | | | |
| $i_1$ | 12 | 13 | 14 | 15 |
| 0-15 | $W_{i_1+24,3}^{(1)}$ | $W_{i_1+24,7}^{(1)}$ | $W_{i_1+24,11}^{(1)}$ | $W_{i_1+24,15}^{(1)}$ | where $W_{m,n}^{(1)} = \frac{1}{2}\begin{bmatrix}v_m\\\varphi_n v_m\end{bmatrix}$

TABLE 8

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,4}^{(2)}$ | $W_{i_1+8,i_1+8,0}^{(2)}$ | $W_{i_1+8,i_1+8,4}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,4}^{(2)}$ | $W_{i_1+24,i_1+24,0}^{(2)}$ | $W_{i_1+24,i_1+24,4}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,4}^{(2)}$ | $W_{i_1+8,i_1+16,0}^{(2)}$ | $W_{i_1+8,i_1+16,4}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,4}^{(2)}$ | $W_{i_1+8,i_1+24,0}^{(2)}$ | $W_{i_1+8,i_1+24,4}^{(2)}$ | where $W_{m,m',n}^{(2)} = \frac{1}{\sqrt{8}}\begin{bmatrix}v_m & v_{m'}\\\varphi_n v_m & -\varphi_n v_{m'}\end{bmatrix}$ Where:

$\varphi_n = e^{j2\pi n/16}$ $v_m = [1\ e^{j2\pi m/32}]^T$

In another example, the codebook for horizontal beamforming for Ranks 1 and 2 may be selected from the following:

TABLE 9

| $i_1$ | $i_2$ | | | |
|---|---|---|---|---|
| | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |

| $i_1$ | $i_2$ | | | |
|---|---|---|---|---|
| | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | |
|---|---|---|---|---|
| | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| $i_1$ | $i_2$ | | | |
|---|---|---|---|---|
| | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}}\begin{bmatrix} v_m \\ \varphi_n v_m \end{bmatrix}$

TABLE 10

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$

TABLE 11

| $i_1$ | $i_2$ | | |
|---|---|---|---|
| | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |

TABLE 11-continued

| $i_1$ | $i_2$ | | |
|---|---|---|---|
| | 3 | 4 | 5 |
| 0-3 | $\tilde{W}_{8i_1+8,8i_1,8i_1}^{(3)}$ | $W_{8i_1+2,8i_1+2,4i_1+10}^{(3)}$ | $W_{8i_1+10,8i_1+2,8i_1+10}^{(3)}$ |

| $i_1$ | $i_2$ | | |
|---|---|---|---|
| | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |

| $i_1$ | $i_2$ | | |
|---|---|---|---|
| | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | |
|---|---|---|---|
| | 12 | 13 | 14 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |

| $i_1$ | $i_2$ |
|---|---|
| | 15 |
| 0-3 | $\tilde{W}_{8i_1+14,8i_1+6,8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$

TABLE 12

| $i_1$ | $i_2$ | | |
|---|---|---|---|
| | 0 | 1 | 2 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ |

| $i_1$ | $i_2$ | | |
|---|---|---|---|
| | 3 | 4 | 5 |
| 0-3 | $W_{8i_1+2,8i_1+10,1}^{(4)}$ | $W_{8i_1+4,8i_1+12,0}^{(4)}$ | $W_{8i_1+4,8i_1+12,1}^{(4)}$ |

| $i_1$ | $i_2$ | |
|---|---|---|
| | 6 | 7 |
| 0-3 | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 13

| $i_1$ | $i_2$ |
|---|---|
| | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 14

| $i_1$ | $i_2$ |
|---|---|
|  | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 15

| $i_1$ | $i_2$ |
|---|---|
|  | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 16

| $i_1$ | $i_2$ |
|---|---|
|  | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Where:

$$\varphi_n = e^{j\pi n/2}$$

$$v_m = [1 \; e^{j2\pi m/32} \; e^{j4\pi m/32} \; e^{j6\pi m/32}]^T$$

And, in this example, let's assume that the Rank 1 precoding matrix for vertical direction beamforming is selected as the same as the Rank 1 precoding matrix for horizontal direction beamforming. Using this assumption, following is an example of codebook for 3D beamforming.

Let's assume the 4 antenna ports case, where there are 2 antennas in horizontal direction and 2 antennas in vertical direction.

Ranks 1 and 2 precoding matrixes are defined as:

$$W_m^{(1)} = \frac{1}{\sqrt{2}} \begin{bmatrix} 1 \\ e^{j2\pi m/4} \end{bmatrix}$$ [Equation 13]

$$W_m^{(2)} = \frac{1}{2} \begin{bmatrix} 1 & 1 \\ e^{j2\pi m/4} & -e^{j2\pi m/4} \end{bmatrix}$$

Horizontal direction precoding matrixes can be:

Rank-1: $Wh_m^{(1)} = W_m^{(1)}$

Rank-2: $Wh_m^{(2)} = W_m^{(2)}$

And, vertical direction precoding matrix can be:

$$Wv_l^{(1)} = W_l^{(1)}$$

then, the precoding matrix for 3D beamforming can be represented as:

Rank-1: [Equation 14]

$$W_{l,m}^{(1)} = Wv_l^{(1)} \otimes Wh_m^{(1)} =$$

$$= \frac{1}{\sqrt{2}} \begin{bmatrix} 1 \\ e^{j2\pi l/4} \end{bmatrix} \otimes \frac{1}{\sqrt{2}} \begin{bmatrix} 1 \\ e^{j2\pi m/4} \end{bmatrix} = \frac{1}{2} \begin{bmatrix} 1 \\ e^{j2\pi l/4} e^{j2\pi m/4} \\ 1 \\ e^{j2\pi l/4} e^{j2\pi m/4} \end{bmatrix}$$

Rank-2:

$$W_{l,m}^{(2)} = Wv_l^{(1)} \otimes Wh_m^{(2)}$$

$$= \frac{1}{\sqrt{2}} \begin{bmatrix} 1 \\ e^{j2\pi l/4} \end{bmatrix} \otimes \frac{1}{2} \begin{bmatrix} 1 & 1 \\ e^{j2\pi m/4} & -e^{j2\pi m/4} \end{bmatrix}$$

$$= \frac{1}{2\sqrt{2}} \begin{bmatrix} 1 & 1 \\ e^{j2\pi l/4} e^{j2\pi m/4} & -e^{j2\pi l/4} e^{j2\pi m/4} \\ 1 & 1 \\ e^{j2\pi l/4} e^{j2\pi m/4} & -e^{j2\pi l/4} e^{j2\pi m/4} \end{bmatrix}$$

In another example, a codebook for 8 antenna ports (4H+2V) can be defined as following.

2 antenna ports

Rank-1: [Equation 15]

$$W_m^{(1,2ports)} = \frac{1}{\sqrt{2}} \begin{bmatrix} 1 \\ e^{j2\pi m/4} \end{bmatrix}$$

Rank-2:

$$W_m^{(2,2ports)} = \frac{1}{2} \begin{bmatrix} 1 & 1 \\ e^{j2\pi m/4} & -e^{j2\pi m/4} \end{bmatrix}$$

4 antenna ports $$\varphi_n = e^{j2\pi n/16}$$ [Equation 16]

$$v_m = [1 \; e^{j2\pi m/32}]^T$$

Rank-1:

$$W_{m,n}^{(1,4ports)} = \frac{1}{2} \begin{bmatrix} v_m \\ \varphi_n v_m \end{bmatrix}$$

-continued

Rank-2:
$$W_{m,m',n}^{(2,4ports)} = \frac{1}{\sqrt{8}}\begin{bmatrix} v_m & v_m \\ \varphi_n v_m & -\varphi_n v_m \end{bmatrix}$$

When 2 ports are defined for vertical domain, Rank 1 precoding matrix for 2 ports can be:

Rank-1: $Wv_l^{(1,2\,ports)} = W_l^{(1,2\,ports)}$ [Equation 17]

When 4 ports are defined for horizontal domain, Ranks 1~4 precoding matrix for 4 ports can be:

Rank-1: $Wh_{m,n}^{(1,4\,ports)} = W_{m,n}^{(1,4\,ports)}$

Rank-2: $Wh_{m,m',n}^{(2,4\,ports)} = W_{m,m',n}^{(2,4\,ports)}$ [Equation 18]

So, precoding matrix for 3D beamforming can be:

Rank-1: [Equation 19]
$$W_{l,m,n}^{(1)} = Wv_l^{(1,2ports)} \otimes Wh_{m,n}^{(1,4ports)}$$
$$= \frac{1}{\sqrt{2}}\begin{bmatrix} 1 \\ e^{j2\pi l/4} \end{bmatrix} \otimes \frac{1}{2}\begin{bmatrix} v_m \\ \phi_n v_m \end{bmatrix}$$
$$= \frac{1}{\sqrt{8}}\begin{bmatrix} v_m \\ \varphi_n v_m \\ e^{j2\pi l/4} v_m \\ e^{j2\pi l/4} \varphi_n v_m \end{bmatrix}$$

Rank-2:
$$W_{l,m,m',n}^{(2)} = Wv_l^{(1,2ports)} \otimes Wh_{m,m',n}^{(2,4ports)}$$
$$= \frac{1}{\sqrt{2}}\begin{bmatrix} 1 \\ e^{j2\pi l/4} \end{bmatrix} \otimes \frac{1}{\sqrt{8}}\begin{bmatrix} v_m & v_m \\ \varphi_n v_m & -\varphi_n v_m \end{bmatrix}$$
$$= \frac{1}{4}\begin{bmatrix} v_m & v_m \\ \varphi_n v_m & -\varphi_n v_m \\ e^{j2\pi l/4} v_m & e^{j2\pi l/4} v_m \\ e^{j2\pi l/4}\varphi_n v_m & -e^{j2\pi l/4}\varphi_n v_m \end{bmatrix}$$

Following is an example for 16 antenna ports (=8(H)+2 (V)).

2 Antenna port

Rank-1:
$$W_m^{(1,2ports)} = \frac{1}{\sqrt{2}}\begin{bmatrix} 1 \\ e^{j2\pi m/4} \end{bmatrix}$$

Rank-2:
$$W_m^{(2,2ports)} = \frac{1}{2}\begin{bmatrix} 1 & 1 \\ e^{j2\pi m/4} & -e^{j2\pi m/4} \end{bmatrix}$$

8 Antenna port $\varphi_n = e^{j\pi n/2}$ $v_m = [1 \; e^{j2\pi m/32} \; e^{j4\pi m/32} \; e^{j6\pi m/32}]^T$ $$W_{m,n}^{(1,8ports)} = \frac{1}{\sqrt{8}}\begin{bmatrix} v_m \\ \varphi_n v_m \end{bmatrix}$$

-continued $$W_{m,m',n}^{(2,8ports)} = \frac{1}{4}\begin{bmatrix} v_m & v_m \\ \varphi_n v_m & -\varphi_n v_m \end{bmatrix}$$

When 2 ports are defined on vertical domain, Rank 1 precoding matrix for 2 ports can be:

Rank-1: $Wv_l^{(1,2\,ports)} = W_l^{(1,2\,ports)}$ [Equation 20]

When 4 ports are defined for horizontal domain, Ranks 1~4 precoding matrixes for 4 port can be:

Rank-1: $Wh_{m,n}^{(1,8\,ports)} = W_{m,n}^{(1,8\,ports)}$

Rank-2: $Wh_{m,m',n}^{(2,8\,ports)} = W_{m,m',n}^{(2,8\,ports)}$ [Equation 21]

So, the precoding matrixes are 3D beamforming can be:

[Equation 22]

Rank-1:
$$W_{l,m,n}^{(1)} = Wv_l^{(1,2\,ports)} \otimes Wh_{m,n}^{(1,8\,ports)}$$
$$= \frac{1}{\sqrt{2}}\begin{bmatrix} 1 \\ e^{j2\pi l/4} \end{bmatrix} \otimes \frac{1}{\sqrt{8}}\begin{bmatrix} v_m \\ \varphi_n v_m \end{bmatrix}$$
$$= \frac{1}{4}\begin{bmatrix} v_m \\ \varphi_n v_m \\ e^{j2\pi l/4} v_m \\ e^{j2\pi l/4}\varphi_n v_m \end{bmatrix}$$

Rank-2:
$$W_{l,m,m',n}^{(2)} = Wv_l^{(1,2\,ports)} \otimes Wh_{m,m',n}^{(2,8\,ports)}$$
$$= \frac{1}{\sqrt{2}}\begin{bmatrix} 1 \\ e^{j2\pi l/4} \end{bmatrix} \otimes \frac{1}{4}\begin{bmatrix} v_m & v_m \\ \varphi_n v_m & -\varphi_n v_m \end{bmatrix}$$
$$= \frac{1}{\sqrt{32}}\begin{bmatrix} v_m & v_m \\ \varphi_n v_m & -\varphi_n v_m \\ e^{j2\pi l/4} v_m & e^{j2\pi l/4} v_m \\ e^{j2\pi l/4}\varphi_n v_m & -e^{j2\pi l/4}\varphi_n v_m \end{bmatrix}$$

Codebooks for the other number of antenna ports can be designed with the same sequence.

Figure 16:
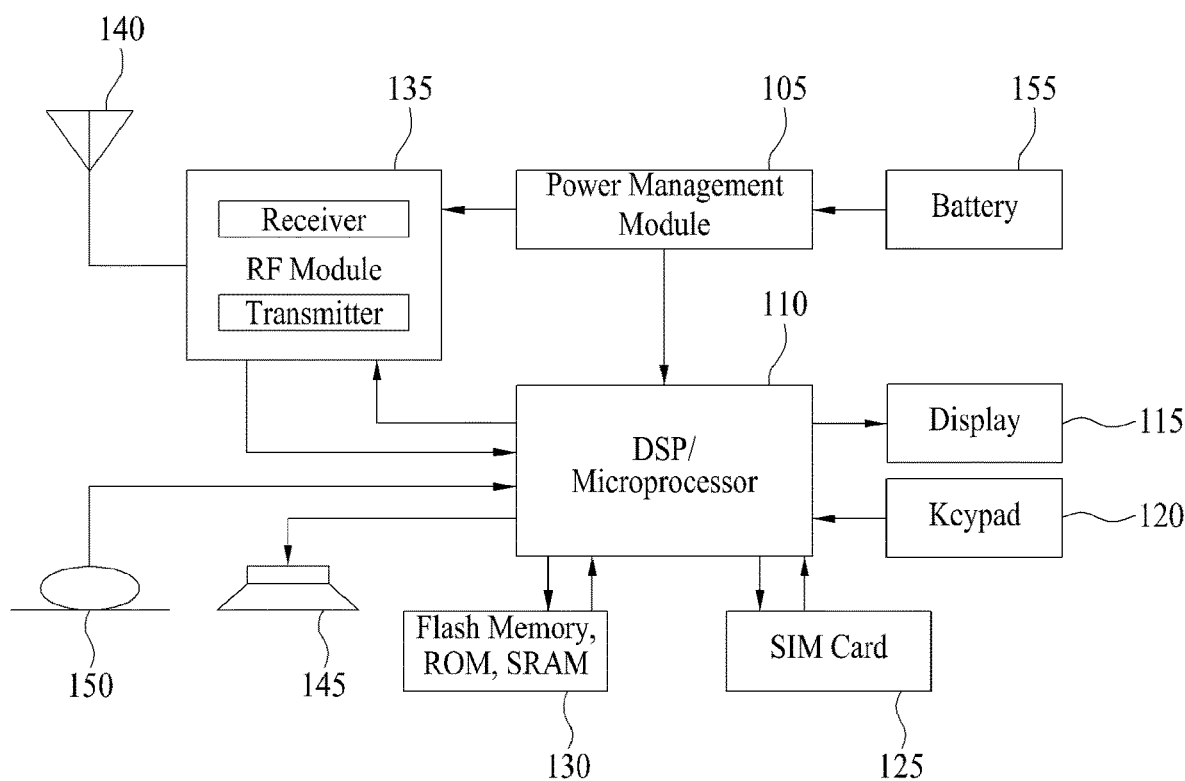
FIG. 16 is a block diagram of a communication apparatus according to an embodiment of the present invention.

FIG. 16 is a block diagram of a communication apparatus according to an embodiment of the present invention.

The apparatus shown in FIG. 16 can be a user equipment WE) adapted to perform the above 3D beamforming operation, but it can be any apparatus for performing the same operation.

As shown in FIG. 16, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting channel status information (CSI) to a base station (BS) by a user equipment (UE) in a wireless communication system, the method comprising:
   receiving reference signals (RSs) from the BS; and
   transmitting, to the BS, the CSI comprising a first codebook index for a first dimension and a second codebook index for a second dimension, based on the RSs,
   wherein the first codebook index represents a first precoding matrix comprising one or more exponential functions dividing $2\pi$ by K and multiplying k, wherein k is within a range between 0 to K/2−1,
   wherein the second codebook index represents a second precoding matrix comprising one or more exponential functions dividing $2\pi$ by H and multiplying h, wherein h is within a range between 0 to H−1 to, and
   wherein K, k, H and h are non-negative integers.

2. The method of claim 1, wherein:
   K represents a number of beams in the first dimension, and
   k represents a beam index in the first dimension.

3. The method of claim 1, wherein:
   H represents a number of beams in the second dimension, and
   h represents a beam index in the second dimension.

4. The method of claim 1, wherein:
   the first codebook index is determined to form a beam within a half of a whole range in the first dimension, and
   the second codebook index is determined to form a beam over a whole range in the second dimension.

5. The method of claim 1, wherein a 3D beam is defined by a kronecker product between the first precoding matrix and the second precoding matrix.

6. A user equipment (UE) in a wireless communication system, the UE comprising:
   a transceiver; and
   a processor connected to the transceiver and configured to:
   receive reference signals (RSs) from a base station (BS); and
   transmit, to the BS, channel status information (CSI) comprising a first codebook index for a first dimension and a second codebook index for a second dimension, based on the RSs,
   wherein the first codebook index represents a first precoding matrix comprising one or more exponential functions dividing $2\pi$ by K and multiplying k, wherein k is within a range between 0 to K/2−1,
   wherein the second codebook index represents a second precoding matrix comprising one or more exponential functions dividing $2\pi$ by H and multiplying h, wherein h is within a range between 0 to H−1 to, and
   wherein K, k, H and h are non-negative integers.

7. The UE of claim 6, wherein:
   K represents a number of beams in the first dimension, and
   k represents a beam index in the first dimension.

8. The UE of claim 6, wherein:
   H represents a number of beams in the second dimension, and
   h represents a beam index in the second dimension.

9. The UE of claim 6, wherein:
   the first codebook index is determined to form a beam within a half of a whole range in the first dimension, and
   the second codebook index is determined to form a beam over a whole range in the second dimension.

10. The UE of claim 6, wherein a 3D beam is defined by a kronecker product between the first precoding matrix and the second precoding matrix.

11. A method for receiving channel status information (CSI) from a user equipment (UE) by a base station (BS) in a wireless communication system, the method comprising:
    transmitting reference signals (RSs) to the UE; and
    receiving, from the UE, the CSI comprising a first codebook index for a first dimension and a second codebook index for a second dimension, based on the RSs,
    wherein the first codebook index represents a first precoding matrix comprising one or more exponential functions dividing $2\pi$ by K and multiplying k, wherein k is within a range between 0 to K/2−1,
    wherein the second codebook index represents a second precoding matrix comprising one or more exponential functions dividing $2\pi$ by H and multiplying h, wherein h is within a range between 0 to H−1 to, and
    wherein K, k, H and h are non-negative integers.

12. The method of claim 11, wherein:
    K represents a number of beams in the first dimension, and
    k represents a beam index in the first dimension.

13. The method of claim 11, wherein:
    H represents a number of beams in the second dimension, and
    h represents a beam index in the second dimension.

14. The method of claim 11, wherein:
    the first codebook index is determined to form a beam within a half of a whole range in the first dimension, and
    the second codebook index is determined to form a beam over a whole range in the second dimension.

15. The method of claim 11, wherein a 3D beam is defined by a kronecker product between the first precoding matrix and the second precoding matrix.

16. A base station (BS) in a wireless communication system, the BS comprising:
    a transceiver; and
    a processor connected to the transceiver and configured to:
    transmit reference signals (RSs) to the UE; and
    receive, from the UE, the CSI comprising a first codebook index for a first dimension and a second codebook index for a second dimension, based on the RSs,
    wherein the first codebook index represents a first precoding matrix comprising one or more exponential functions dividing $2\pi$ by K and multiplying k, wherein k is within a range between 0 to K/2−1,
    wherein the second codebook index represents a second precoding matrix comprising one or more exponential functions dividing $2\pi$ by H and multiplying h, wherein h is within a range between 0 to H−1 to, and
    wherein K, k, H and h are non-negative integers.

17. The BS of claim 16, wherein:
    K represents a number of beams in the first dimension, and
    k represents a beam index in the first dimension.

18. The BS of claim 16, wherein:
    H represents a number of beams in the second dimension, and
    h represents a beam index in the second dimension.

19. The BS of claim 16, wherein:
the first codebook index is determined to form a beam within a half of a whole range in the first dimension, and
the second codebook index is determined to form a beam over a whole range in the second dimension.

20. The BS of claim 16, wherein a 3D beam is defined by a kronecker product between the first precoding matrix and the second precoding matrix.

* * * * *